United States Patent
Subramanya et al.

(10) Patent No.: US 8,195,619 B2
(45) Date of Patent: Jun. 5, 2012

(54) EXTENT REFERENCE COUNT UPDATE SYSTEM AND METHOD

(75) Inventors: Sunil Kumar Tekkatte Subramanya, Sunnyvale, CA (US); Pramodh Pisupati, Sunnyvale, CA (US); Balemurughan Kumaresan, East Palo Alto, CA (US); Charles H. Silvers, Santa Clara, CA (US); Brad Allen Boyer, San Jose, CA (US); Ajay Purushottam Salpekar, Hayward, CA (US)

(73) Assignee: Symantec Corporation, Mountain View, CA (US)

( * ) Notice: Subject to any disclaimer, the term of this patent is extended or adjusted under 35 U.S.C. 154(b) by 68 days.

(21) Appl. No.: 12/858,393

(22) Filed: Aug. 17, 2010

(65) Prior Publication Data
US 2012/0047115 A1  Feb. 23, 2012

(51) Int. Cl.
*G06F 17/00* (2006.01)
(52) U.S. Cl. ........ 707/672; 707/640; 707/661; 707/696; 707/821; 711/161
(58) Field of Classification Search .................. None
See application file for complete search history.

(56) References Cited

U.S. PATENT DOCUMENTS

| | | | | |
|---|---|---|---|---|
| 5,940,838 A * | 8/1999 | Schmuck et al. | | 1/1 |
| 5,987,457 A * | 11/1999 | Ballard | | 1/1 |
| 6,993,770 B1 * | 1/2006 | Detlefs et al. | | 719/315 |
| 8,032,498 B1 * | 10/2011 | Armangau et al. | | 707/690 |
| 8,037,279 B2 * | 10/2011 | Schuba et al. | | 711/203 |
| 2003/0182465 A1 * | 9/2003 | Moir et al. | | 709/314 |
| 2005/0278279 A1 * | 12/2005 | Petev et al. | | 707/1 |

OTHER PUBLICATIONS

Castro et al, "Lazy Reference Counting for Transactional Storage Systems", Laboratory for Computer Science, Massachusetts Institute of Technology, 1997.*
Joao et al, "Flexible Reference-Counting-Based Hardware Acceleration for Garbage Collection", ACM, 2009.*

* cited by examiner

*Primary Examiner* — Hung Le (57) ABSTRACT

Systems and methods for extent reference count updates are presented. In one embodiment; a reference count update method includes: receiving an indication of new reference association with an extent of a shared storage component; generating reference count update log information for a reference count update log to indicate the new reference association with an extent of a shared storage component, wherein the altering occurs inline; forwarding a successful data update indicator to initiator of activity triggering the new reference association with the extent of the shared storage component; and updating a reference count table in accordance with the information in the reference count update log, wherein the updating is included in a background process.

20 Claims, 10 Drawing Sheets

FIG 1

| Reference Count Update Log 200 | | |
|---|---|---|
| Starting Block Number of the Extent 211 | Size of Extent 212 | Reference Count Adjustment Indicator (e.g., increment/decrement) 213 |
| Starting Block Number of the Extent 221 | Size of Extent 222 | Reference Count Adjustment Indicator (e.g., increment/decrement) 223 |
| Starting Block Number of the Extent 231 | Size of Extent 232 | Reference Count Adjustment Indicator (e.g., increment/decrement) 233 |
| Starting Block Number of the Extent 241 | Size of Extent 242 | Reference Count Adjustment Indicator (e.g., increment/decrement) 234 |

310
Receiving an indication of new reference association.

320
Generating reference count update log information.

330
Forwarding a successful data update indicator to initiator of activity triggering the new reference association

340
Updating a reference count table in accordance with the information in the reference count update log.

| RCT 550 | | |
|---|---|---|
| EI 553<br>200 - 299 | | RCI 554<br>1 |
| EI 555<br>300-399 | | RCI 556<br>1 |

| RCUL 530 | | |
|---|---|---|
| SBN 531<br>200 | SOE 532<br>100 | RCAI 533<br>Inc |
| SBN 534<br>300 | SOE 535<br>100 | RCAI 536<br>Inc |

Node 510
File 511

| 810<br>Detection module for receiving an indication of new reference association. |
|---|
| 820<br>Reference count update log creation module for generating reference count update log information. |
| 830<br>Reply module for forwarding a successful data update indicator to initiator of activity triggering the new reference association. |
| 840<br>Table update module for updating a reference count table in accordance with the information in the reference count update log. |

EXTENT REFERENCE COUNT UPDATE SYSTEM AND METHOD

FIELD OF THE INVENTION

The present embodiments relate to the field of information storage replication.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of important and confidential information and significant resources are expended storing and processing the information. Maintaining and tracking changes and updates to the information is often very important for a variety or reasons (e.g., recovery, corruption correction, etc.).

Block reference counts are often utilized to track the number of files sharing blocks when implementing data sharing in file system. Typically a variation of a b-tree type data structure is utilized to track such reference counts. Portions or extents of data (e.g., blocks, ranges, etc.) can become shared or unshared during operations such as file snapshot creation, writing to shared blocks, truncating shared blocks, deduplication of data between files, etc. These operations can occur in a variety of environments (e.g., general file system environment, virtual machine environment, etc.). When these operations do occur, it is usually necessary to update the reference counts in the b-tree during such operations. However, b-tree updates typically involve multiple disk I/Os and as a result often cause unacceptable performance penalties, especially in a cluster file system environment. Furthermore, the b-tree itself can become a source of contention, which usually worsens in the case of a cluster environment.

SUMMARY

Systems and methods for extent reference count updates are presented. In one embodiment; a reference count update method includes: receiving an indication of new reference association with an extent of a shared storage component; generating reference count update log information for a reference count update log to indicate the new reference association with an extent of a shared storage component, wherein the altering occurs inline; forwarding a successful data update indicator to initiator of activity triggering the new reference association; and updating a reference count table in accordance with the information in the reference count update log, wherein the updating is completed at a later time not inline (e.g., at a scheduled time, included in a background process, etc.). In one exemplary implementation, the reference count update log information is a constant size. The reference count update log information can be a size corresponding to a smallest size of a storage transaction of a system. The reference count update log information size can also be independent of a size of the extent of a shared storage component. In one embodiment, a first time for performing the generating of the reference count update log information is independent of a second time for performing the updating of the reference count table. The reference count update log information can be applied to the reference count table in any order. Generating the reference count update log information and updating the reference count table can be performed in a cluster file system, and the reference count update log is dedicated to a cluster file system node and the reference count update log can be updated in parallel with other reference count update logs associated with other nodes.

In one embodiment, a computer readable storage medium having stored thereon, computer executable instructions that, if executed by a computer system cause the computer system to perform a method. In one embodiment, the method includes: receiving an indication of new reference association with an extent of a shared storage component; generating reference count update log information for a reference count update log to indicate the new reference association with an extent of a shared storage component, wherein the altering occurs inline; forwarding a successful data update indicator to initiator of activity triggering the new reference association; and updating a reference count table in accordance with the information in the reference count update log, wherein the updating is included in a background process.

In one exemplary implementation, a computer system has a processor coupled to a computer readable storage media and the computer system executes computer readable code which causes the computer system to perform operations including: receiving an indication of new reference association with an extent of a shared storage component; generating reference count update log information for a reference count update log to indicate the new reference association with an extent of a shared storage component, wherein the altering occurs inline; forwarding a successful data update indicator to initiator of activity triggering the new reference association; and updating a reference count table in accordance with the information in the reference count update log, wherein the updating is included in a background process.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

DETAILED DESCRIPTION

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, it will be obvious to one ordinarily skilled in the art that the present invention may be practiced without these specific details. In other instances, well known methods, procedures, components, and circuits have not been described in detail as not to unnecessarily obscure aspects of the current invention.

The present systems and methods facilitate efficient and effective extent reference count update. Present systems and methods facilitate extent reference count update with minimal impact on inline operation. For example, present system and methods can facilitate fast constant inline reference count update tracking while permitting multiple input and output operations associated with the extent reference count update to be performed at a convenient time (e.g., at a later time, "off-line", in the background, etc.). In one exemplary implementation, a timing adjustment of a reference count table data structure update does not significantly impact performance because during the majority of normal operations an exact reference count is not necessary. In instances where the exact reference count is desirable (e.g., freeing up an extent, etc.) the present system and method enable the exact reference count to be determined. The "in-line" time savings is generally a greater benefit than a possible minor inconvenience of a delay in the exact reference count update. In one embodiment, the log information is constant size. It is appreciated that the present systems and methods can be implemented for storage of information (e.g., instructions, data, etc.) in a variety of storage resource configurations.

In one embodiment, the systems and methods facilitate updating of extent reference counts in a cluster file system. In one exemplary implementation, the performance of present operations can be independent of the size of the data structure used to store the reference counts. The performance of present operations can also be unaffected by the number of nodes doing parallel reference count updates in the cluster file system. In one exemplary implementation, the reference count update log is dedicated to a node and can act independently.

In one embodiment, the present systems and methods can utilize delayed reference count updates in the reference count table data structure by introducing a new layer called Reference Count Update Log (RCUL). When a reference count update is performed for a file system extent, the update operation is recorded in the RCUL transactionally. In one embodiment, each record in the RCUL is of fixed size and can contain various information (e.g., starting block number of the extent, size of the extent, increment or decrement reference count, etc.). After the information is recorded in the RCUL the actual update to the reference count table data structure can be performed later asynchronously. In one embodiment, when a reference count becomes zero it remains zero until the extent is freed up. It is appreciated that an RCUL can be utilized to facilitate updating of a variety of reference count table data structures (e.g., a B-tree data structure, a dynamic hash table data structure, etc.). While the following descriptions may refer to a particular type of reference count table data structure (e.g., B-tree, etc.) it is appreciated the present invention can be implemented with a variety of other types of reference count table data structures (e.g., dynamic hash table data structure, etc.).

Figure 1:
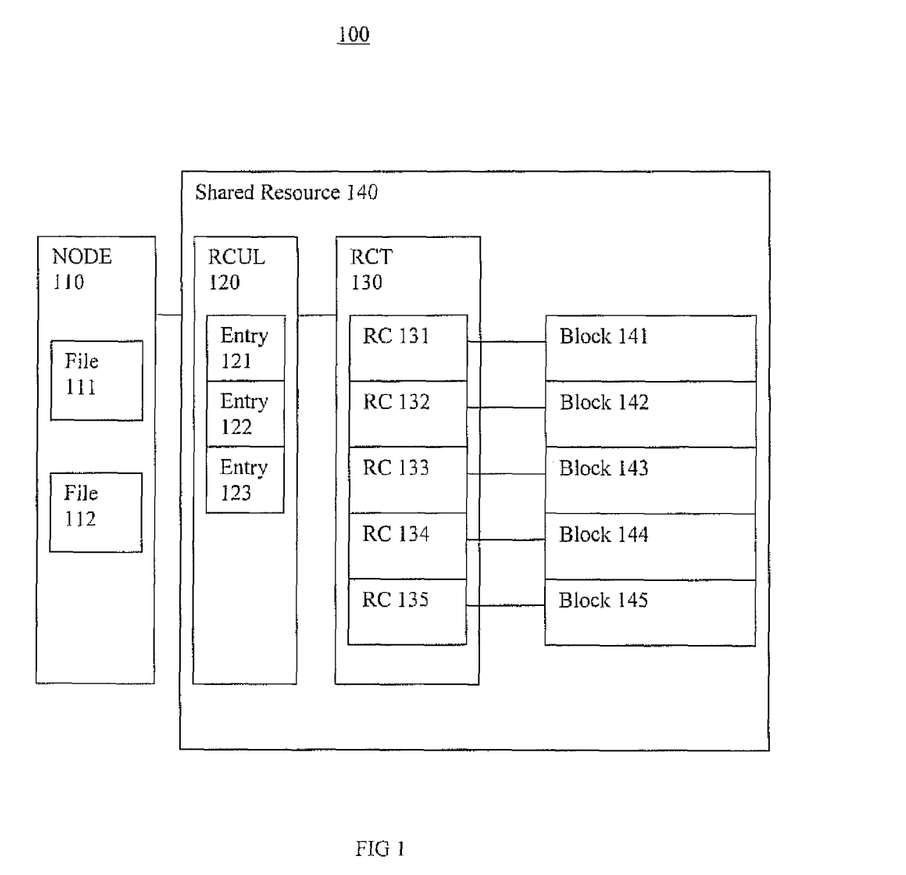
FIG. 1 is an exemplary block diagram of exemplary file system storage architecture in accordance with one embodiment.

FIG. 1 is an exemplary block diagram of exemplary file system storage architecture 100 in accordance with one embodiment. File system storage architecture 100 includes node 110 and shared resource 140. Node 110 is processing information associated with files 111 and 112. Shared resource 140 stores information associated with reference count update log (RCUL) 120, reference count table (RCT) 130 and storage blocks 141 through 145. Reference count update log (RCUL) 120 includes reference count log entries 121 through 123. Reference count table 130 includes reference count indicators 131 through 135. The reference count update log 120 is able to rapidly interact inline with the node 110 to facilitate efficient resolution of updates to the shared resource 140 that affect reference count.

Figure 2:
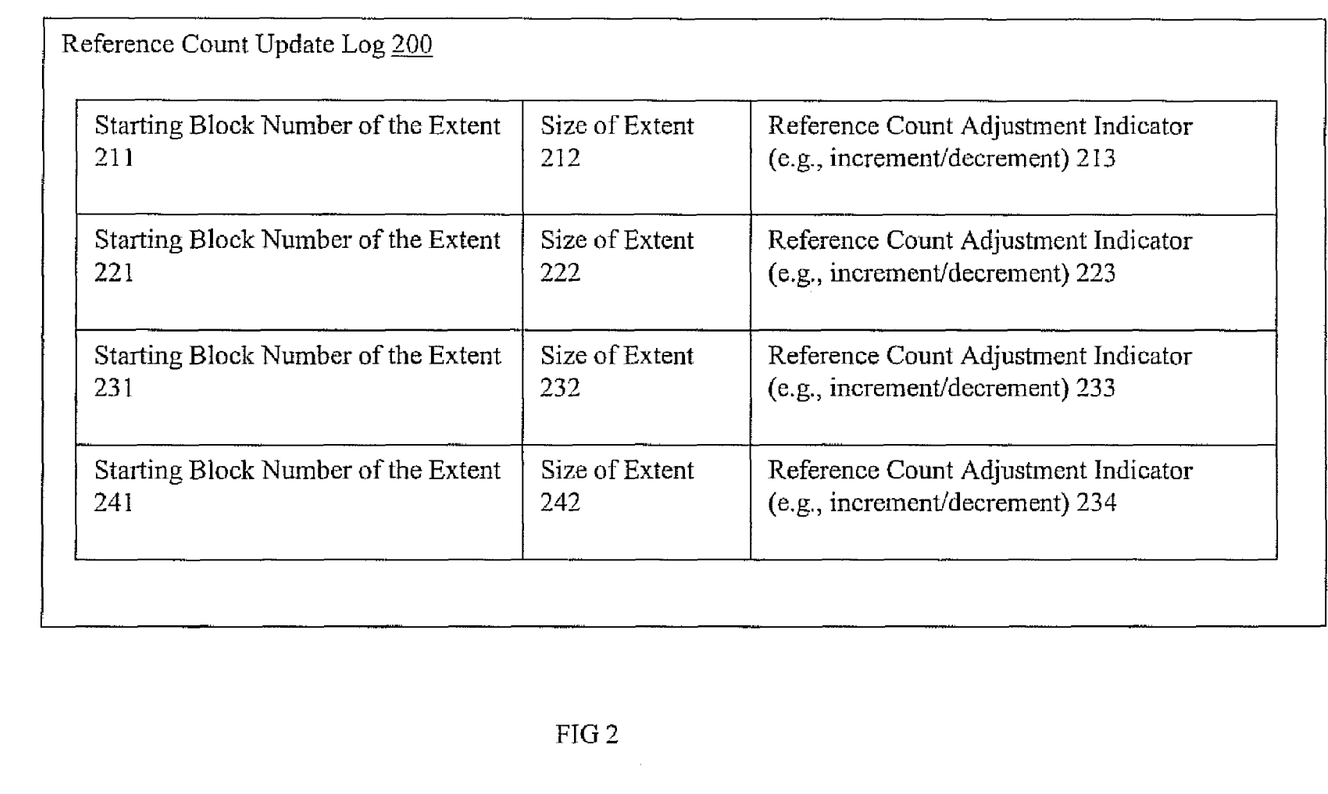
FIG. 2 is a block diagram of an exemplary reference count update log in accordance with one embodiment of the present invention.

FIG. 2 is a block diagram of an exemplary reference count update log 200 in accordance with one embodiment of the present invention. Reference count update log 200 include starting block number of the extent indications 211 through 241, size of the extent indicators 212 through 242 and reference count adjustment indicators 213 through 234. Starting block number of the extent indications 211 through 241 indicate starting block numbers of a storage block or extent associated with the respective reference count update. Size of the extent indicators 212 through 242 indicate the size (e.g., address range, bytes, bits, etc.) of the storage blocks or extents associated with the respective reference count update. Reference count adjustment indicators 213 through 234 indicate an adjustment (e.g., increment, decrement, etc.) to the respective reference counts.

Present RCUL implementations can provide a number of benefits for overall enhanced performance. In one embodiment, adding a RCUL record involves writing a relatively small fixed number of bytes (e.g., 32 bytes, etc.). This can be irrespective of the size of the file system extent involved in the operation. Since information recorded in the RCUL is very small, the I/O contention to perform the operations can be substantially less than updating the b-tree directly. In a cluster file system each node can have its own dedicated RCUL. As a result, the nodes in the cluster can update their respective RCULs in parallel. The reference count update log can be dedicated to a cluster file system node and the reference count update log can be updated in parallel with other reference count update logs associated with other nodes.

The records in the RCUL can be processed and applied to the actual RCT table (e.g., dynamic hash table, b-tree, etc.) in the background. This would mean that obtaining the exact reference count for a shared file system extent would require processing all the RCULs in the cluster and applying the logged operations to the b-tree. This is an expensive operation and should be avoided in the context of operations such as file snapshot creation, write to shared extents, truncation of shared extents, etc.

Figure 3:
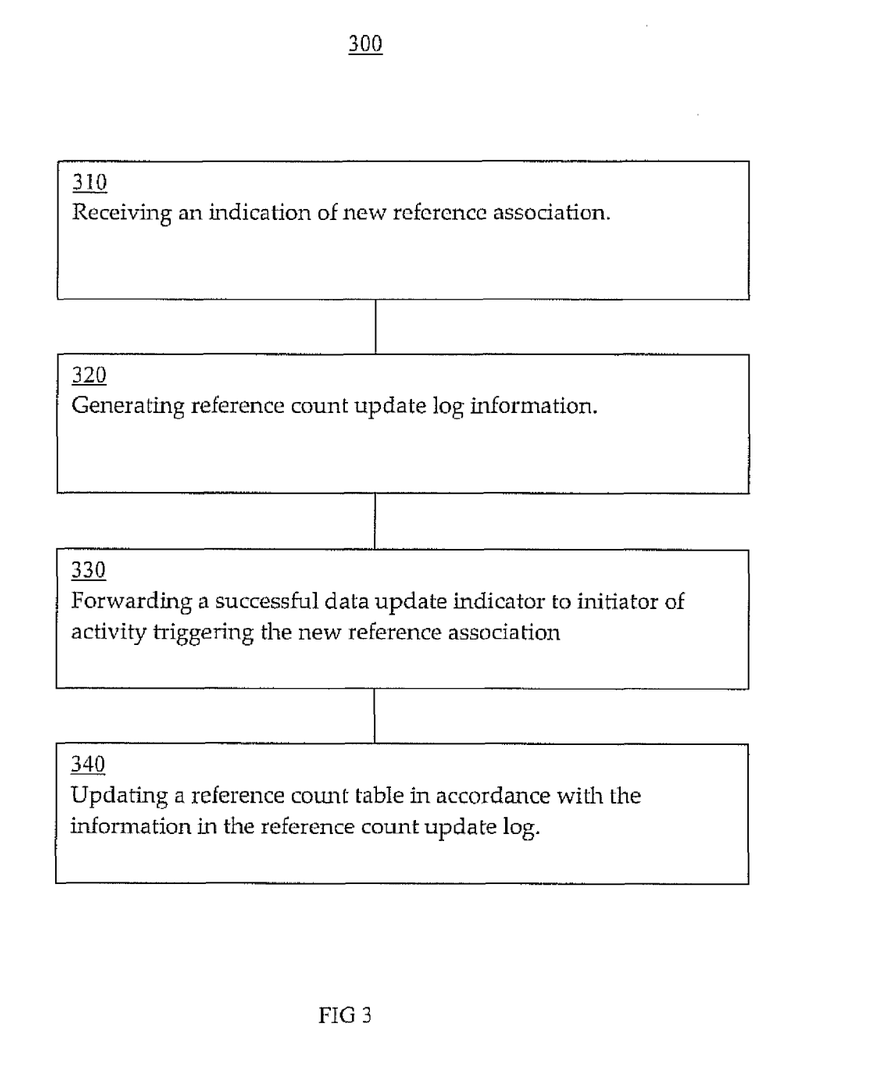
FIG. 3 is flow chart of an exemplary reference count update method in accordance with one embodiment of the present invention.

FIG. 3 is a flow chart of an exemplary reference count update method 300 in accordance with one embodiment of the present invention.

In block 310 an indication of new reference association is received. In one embodiment, the reference association corresponds to an extent of a shared storage component.

In block 320, reference count update log information is generated for a reference count update log. In one embodiment, the reference count update log information indicates the new reference association with an extent of a shared storage component. In one exemplary implementation the generation of the reference count update log information occurs inline. A first time for performing the generating of the reference count update log information can be independent of a second time for performing the updating of the reference count table.

In one embodiment, the reference count update log information is generated in a manner to facilitate rapid inline response. In one exemplary implementation, reference count update log information is a constant size. The reference count update log information can be a size corresponding to a smallest size of a storage transaction of a system. The reference count update log information size can be independent of a size of the extent of a shared storage component.

In block 330, a successful data update indicator is forwarded to an initiator of activity triggering the new reference association with the extent of the shared storage component. In one embodiment, a successful write response is forwarded to an initiator of a write request.

In block 340, a reference count table is updated in accordance with the information in the reference count update log. In one embodiment, the updating is included in or performed as part of a background process. In one embodiment, the updating can also include performing operations associated with sharing an extent (e.g., de-duplication, snapshot creation, etc.) and unsharing an extent (e.g., a copy-on-write for a shared extent, etc.).

Exemplary reference count update method 300 can be implemented with multiple nodes in a cluster file system. In one embodiment, a reference count update log is dedicated to a cluster file system node and the reference count update log can be updated in parallel with other reference count update logs associated with other nodes. The ability to perform a node update does not have to be dependent on the process of updates in other nodes.

Figure 4:
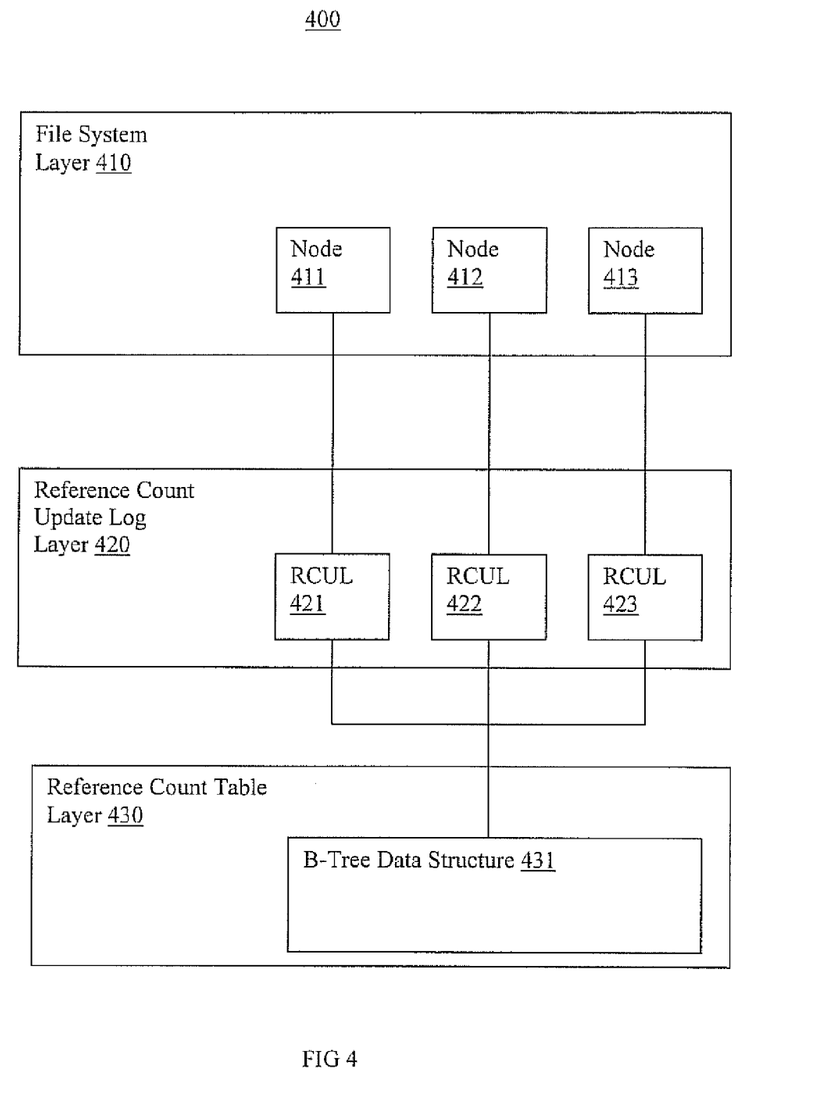
FIG. 4 is a block diagram of an exemplary multi-node file system storage hierarchy 400 in accordance with one embodiment.

FIG. 4 is a block diagram of an exemplary multi-node file system storage hierarchy 400 in accordance with one embodiment. Multi-node file system storage hierarchy 400 includes file system layer 410, reference count update log layer 420 and reference count table layer 430. File system layer 410 includes nodes 411 through 413. In one embodiment, nodes 411 through 413 are similar to node 110. Reference count update log layer 420 includes reference count update logs (RCULs) 421 through 423. In one exemplary implementation, reference count update logs 421 through 423 are queues. The reference count update logs 421 through 423 can be similar to reference count update log 120. Reference count table layer 430 includes b-tree data structure 431. In one embodiment, b-tree data structure 431 is similar to RCT 130.

In one embodiment, reference count queues 421 through 423 are dedicated to nodes 411 through 413 respectively. Transactions involving reference count updates for each node can be performed independently inline. Each node enters the respective reference count update information in corresponding reference count queues 421 through 423 inline. The reference count update information can be updated in the b-tree data structure 431 later (e.g., in background processing, etc.).

Figure 5:
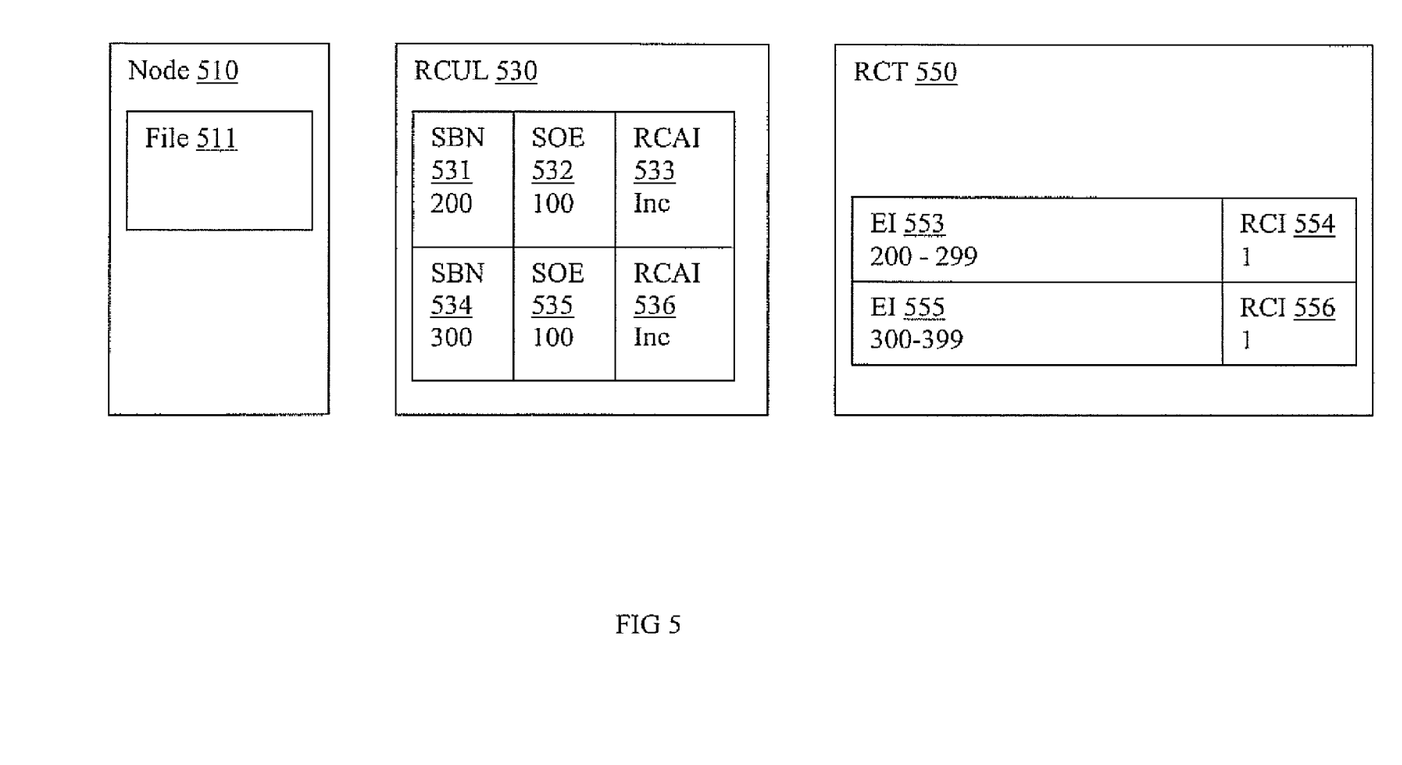
FIG. 5 is a block diagram of an exemplary reference count configuration of a file system before an update in accordance with one embodiment of the present invention.

FIG. 5 is a block diagram of an exemplary reference count configuration of a file system before an update in accordance with one embodiment of the present invention. The file system includes node 510 reference count update log 530 and reference count table 550. Node 510 is performing processing associated with file 511. Reference count update log 530 includes two entries. The first entry includes starting block number indicator 531 set at a value of 200, size of extent indicator 532 set at a value of 100 and reference count adjustment indicator 533 set at "increment". The second entry includes starting block number indicator 534 set at a value of 300, size of extent indicator 535 set at a value of 100 and reference count adjustment indicator 536 set at "increment". Reference count table 550 includes two rows that have been configured to correspond to the information in reference count update log 530. The first row includes extent indicator 553 and reference count indicator 554. Extent indicator 553 is set at range 200-299 and reference count indicator 554 is set at 1. The first row includes extent indicator 553 and reference count indicator 554. Extent indicator 553 is set at range 200-299 and reference count indicator 554 is set at 1. The second row includes extent indicator 555 and reference count indicator 556. Extent indicator 555 is set at range 300-399 and reference count indicator 556 is set at 1.

Figure 6:
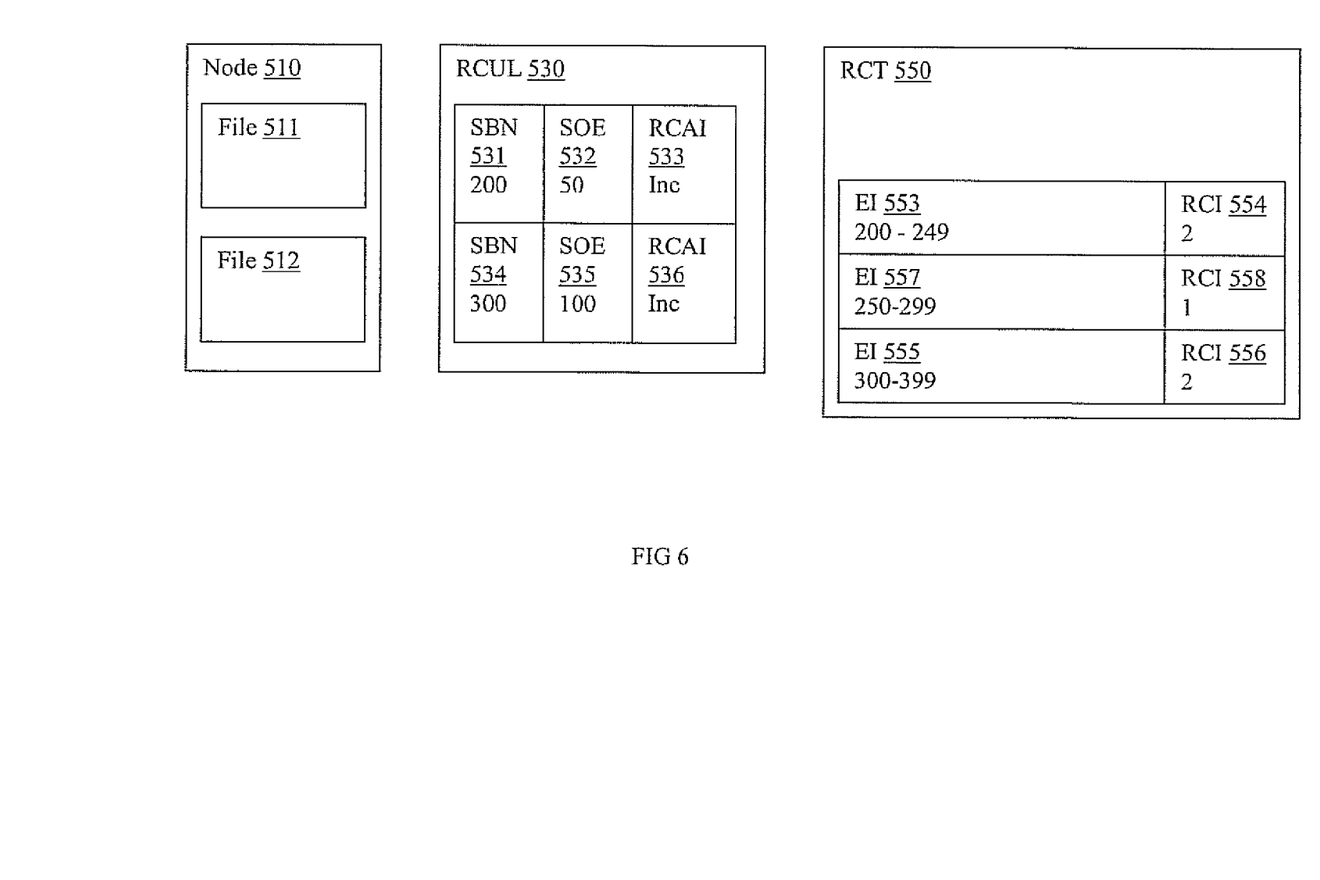
FIG. 6 is a block diagram of an exemplary reference count configuration of a file system after an update in accordance with one embodiment of the present invention.

FIG. 6 is a block diagram of an exemplary reference count configuration of a file system after an update in accordance with one embodiment of the present invention. Processing associated with file 512 is begun on node 512. The processing of file 512 includes transactions that involve interaction with extents 200-249 and 300-399. The reference count update log 530 entries are change inline to reflect the new reference count information. For example, the first entry includes starting block number indicator 531 is set at a value of 200, size of extent indicator 532 is changed to a value of 50 and reference count adjustment indicator 533 is set at "increment". The second entry includes starting block number indicator 534 is set at a value of 300, size of extent indicator 535 is set at a value of 100 and reference count adjustment indicator 536 is again set at "increment".

Offline from the initiating transaction from node 510 (e.g., in the background), reference count table 550 is updated to reflect the changes. Extent indicator 553 is changed to a range of 200-249 and reference count indicator 554 is changed to 2. A new row with extent indicator 557 and reference count indicator 558 is added. Extent indicator 557 is set at range 250-299 and reference count indicator 558 is set at 1. Extent indicator 555 is set at range 300-399 and reference count indicator 556 is changed to 2.

Figure 7:
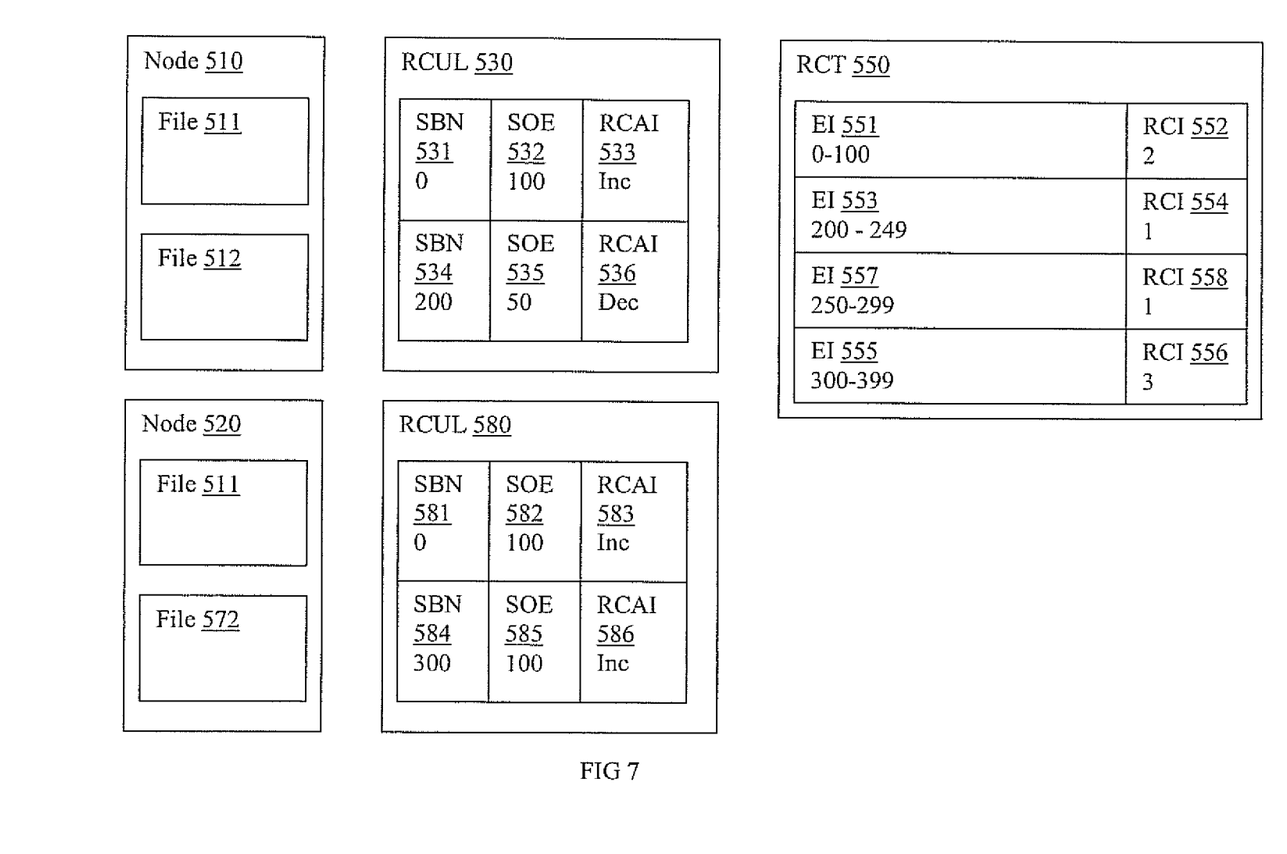
FIG. 7 is a block diagram of an exemplary reference count configuration of a file system with an additional node added in accordance with one embodiment of the present invention.

FIG. 7 is a block diagram of an exemplary reference count configuration of a file system with an additional node added in accordance with one embodiment of the present invention. Node 520 is added with files 511 and file 572 and corresponding reference count update log 580 is also added. The processing of file 511 includes transactions that involve interaction with extents 200-249 and the processing of file 572 includes transactions that involve interaction with extents 300-399. The reference count update log 580 entries are changed inline to reflect the new reference count information. For example, the first entry includes starting block number indicator 581 set at a value of 0, size of extent indicator 582 is set to a value of 100 and reference count adjustment indicator 583 is set at "increment". The second entry includes starting block number indicator 584 is set at a value of 300, size of extent indicator 585 is set at a value of 100 and reference count adjustment indicator 586 is set at "increment".

FIG. 7 also indicates additional reference count changes associated with node 510. For example, the first entry includes starting block number indicator 531 is set at a value of 0, size of extent indicator 532 is changed to a value of 100 and reference count adjustment indicator 533 is set at "increment". The second entry includes starting block number indicator 534 is set at a value of 200, size of extent indicator 535 is set at a value of 50 and reference count adjustment indicator 536 is set at "decrement".

Offline from the initiating transactions from nodes 510 and 520 (e.g., in the background), reference count table 550 is updated to reflect the changes. A new row is added and includes extent indicator 551 and reference count indicator 552. Extent indicator 551 is set at range 0-100 and reference count indicator 552 is set at 2. The reference count indicator for extent 0-199 is changed to 2 because there is an increment in both RCUL 530 and 580. It does not matter which RCUL entry is dealt with first, however a "consistent" reading of the reference count is available after both RCUL 530 and 580 logs are processed. Extent indicator 553 is still set at a range 200-249 and reference count indicator 554 is changed to 1. Extent indicator 555 is still set at range 300-399 and reference count indicator 556 is changed to 3.

Figure 8:
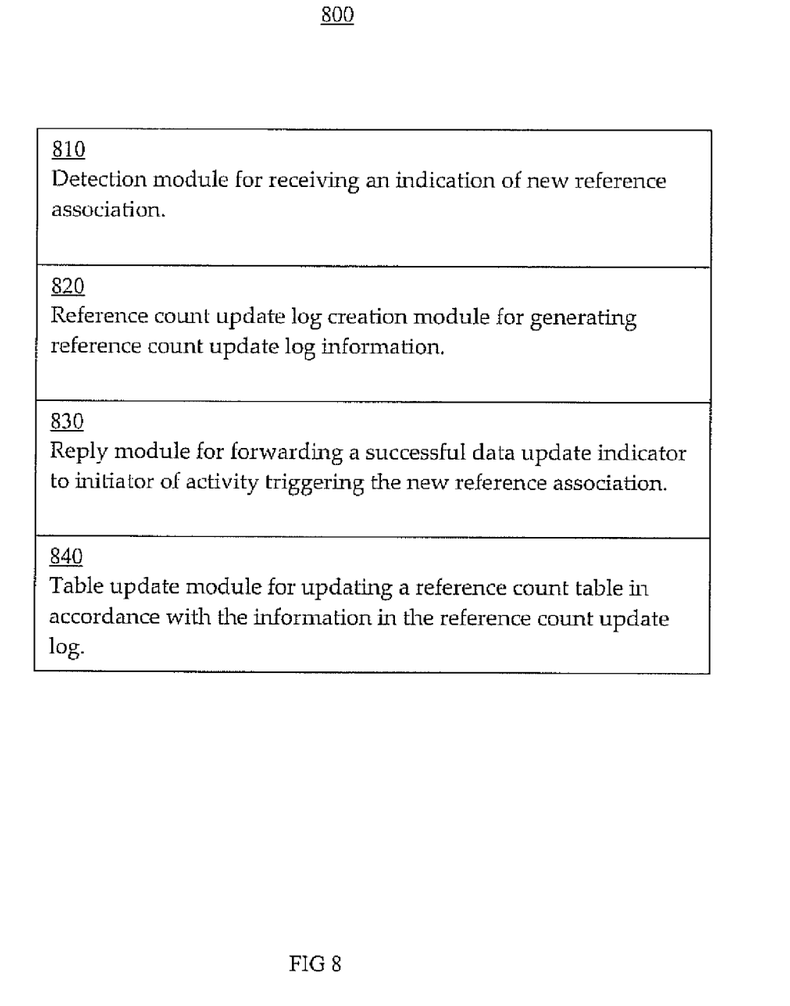
FIG. 8 is a block diagram of an exemplary reference count update module in accordance with one embodiment of the present invention.

FIG. 8 is a block diagram of reference count update module 800 which includes instructions for directing a processor in performance of a reference count update method (e.g., a reference count update method 300, etc.). Reference count update module 800 includes detection module 810, reference count update log creation module 820, reply module 830, and table update module 840. Detection module 810 includes instructions for receiving an indication of new reference association. In one embodiment, detection module 810 includes instructions for receiving an indication of new reference association of block 310. Reference count update log creation module 820 includes instructions for generating reference count update log information. In on embodiment, reference count update log creation module 820 includes instructions for generating reference count update log information of block 320. Reply module 830 includes instructions for forwarding a successful data update indicator to initiator of activity triggering the new reference association. In one embodiment, reply module 830 includes instructions for forwarding a successful data update indicator to initiator of activity triggering the new reference association of block 330. Table update module 840 includes instructions for updating a reference count table in accordance with the information in the reference count update log. In one embodiment, table update module 840 includes instructions for updating a reference count table of block 340.

Figure 9:
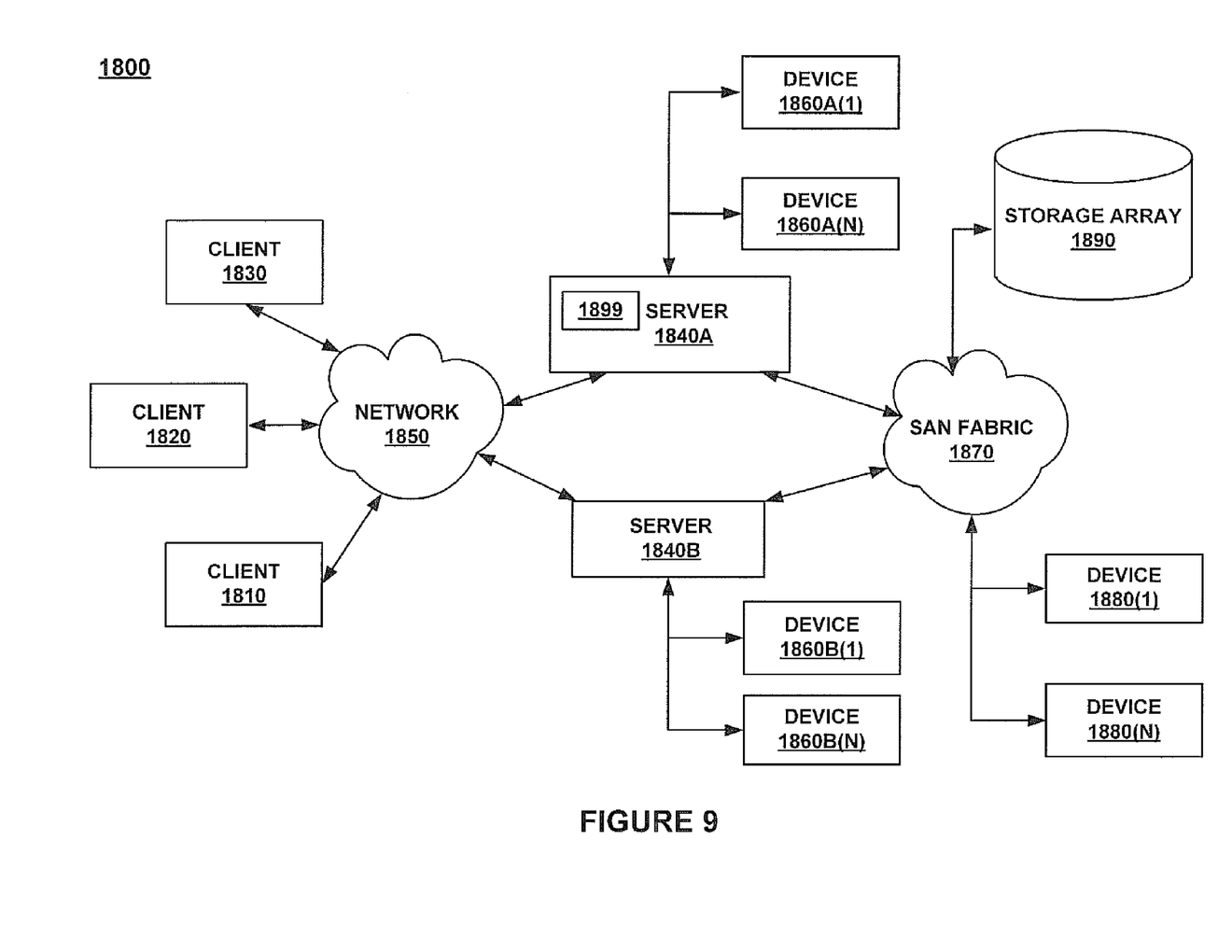
FIG. 9 is a block diagram of an exemplary network architecture in accordance with one embodiment of the present invention.

In one embodiment, reference count update method 300 can be implemented on a network. FIG. 9 is a block diagram depicting a network architecture 1800 in which client systems 1810, 1820 and 1830, as well as storage servers 1840A and 1840B (any of which can be implemented using computer system 210), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes reference count update module 1899. In one embodiment, reference count update module 1899 is similar to similar to reference count update module 800. It is appreciated that present systems and methods are compatible with a variety of implementations. For example, portions of information and instructions associated with can be distributed in various resources.

Figure 10:
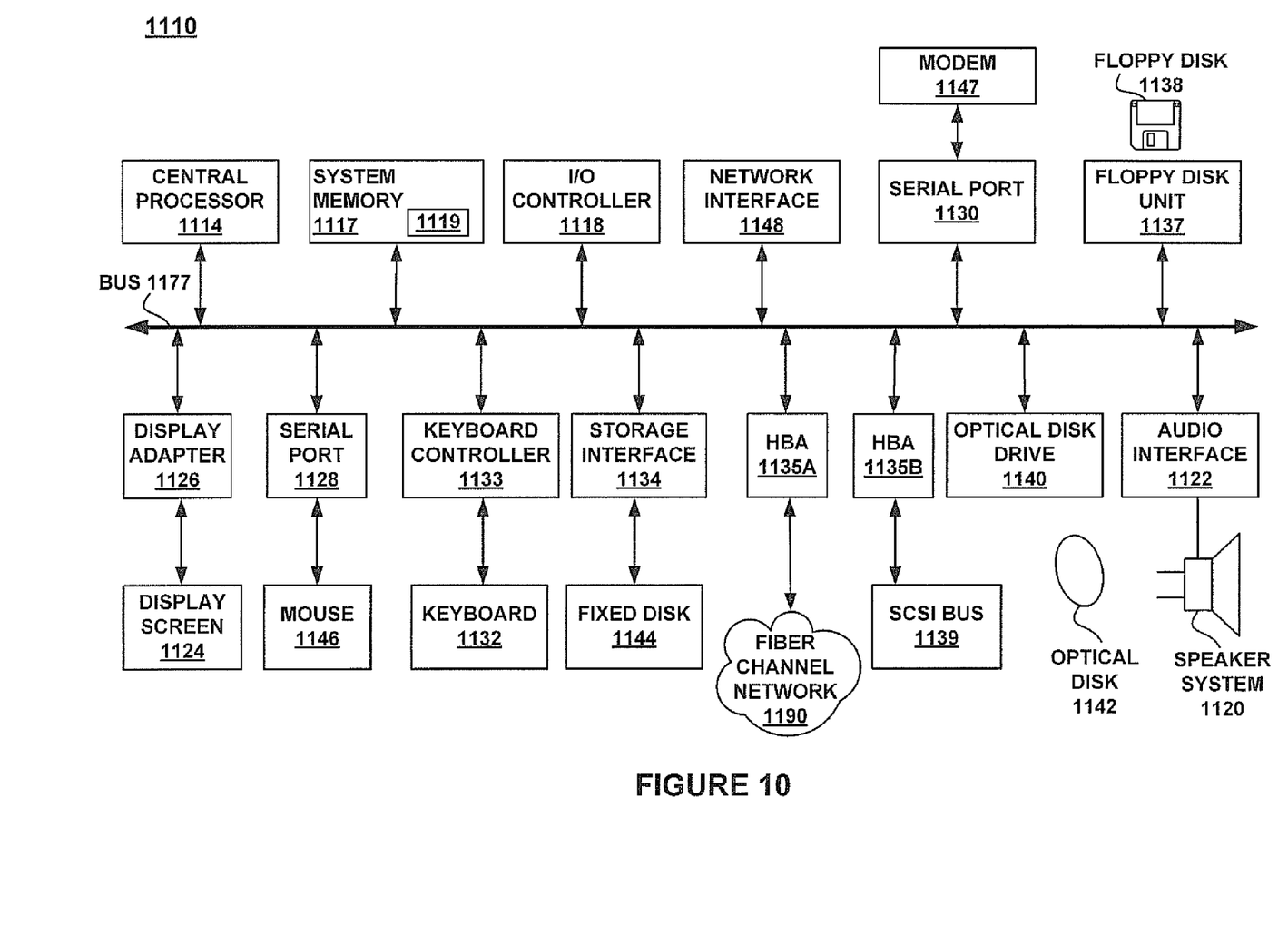
FIG. 10 depicts a block diagram of an exemplary computer system suitable for implementing the present methods in accordance with one embodiment of the present invention.

FIG. 10 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1112 via serial port 1128), a modem 1147 (coupled to bus 1112 via serial port 1130), and a network interface 1148 (coupled directly to bus 1112).

Bus 1177 allows data communication between central processor 1114 and system memory 1117, which may include read-only memory (ROM) or flash memory (neither shown), and random access memory (RAM) (not shown), as previously noted. In one embodiment, instructions for performing a reference count update method (e.g., similar to reference count update method 300) are stored in one or more memories of computer system 1100 (e.g., in memory location 1119). The RAM is generally the main memory into which the operating system and application programs are loaded. In one embodiment, RAM 1117 includes a reference count update module (e.g., in memory location 1119). In one embodiment, a reference count update module stored in memory location 1119 is similar to reference count update module 800. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 248.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on storage server 1840A or 1840B using, for example, a web browser or other client software (not shown). Such a client allows client systems 1810, 1820 and 1830 to access data hosted by storage server 1840A or 1840B or one of storage devices 1860A(1)-(N), 1860B(1)-(N), 1880(1)-(N) or intelligent storage array 190. FIG. 9 depicts the use of a network such as the Internet for exchanging data, but the present disclosure is not limited to the Internet or any particular network-based environment.

Thus, the present systems and methods facilitate efficient and effective extent reference count update. Present systems and methods facilitate extent reference count update with minimal impact on inline operation. For example, present system and methods can facilitate fast constant inline reference count update tracking while permitting multiple input and output operations associated with the extent reference count update to be performed in the background.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A reference count update method comprising:
receiving an indication of new reference association with an extent of a shared storage component;
generating reference count update log information for a reference count update log to indicate said new reference association with an extent of a shared storage component, wherein said altering occurs inline;
forwarding a successful data update indicator to an initiator of activity triggering said new reference association; and
updating a reference count table in accordance with said information in said reference count update log, wherein said updating is included in a background process.

2. The reference count update method of claim 1 wherein said reference count update log information is a constant size.

3. The reference count update method of claim 1 wherein said reference count update log information is a size corresponding to a smallest size of a storage transaction of a system.

4. The reference count update method of claim 1 wherein said reference count update log information size is independent of a size of said extent of a shared storage component.

5. The reference count update method of claim 1 wherein a first time for performing said generating of said reference count update log information is independent of a second time for performing said updating of said reference count table.

6. The reference count update method of claim 1 wherein said reference count update log information can be applied to said reference count table in any order.

7. The reference count update method of claim 1 wherein said generating reference count update log information and said updating said reference count table are performed in a cluster file system, and said reference count update log is dedicated to a cluster file system node and said reference count update log can be updated in parallel with other reference count update logs associated with other nodes.

8. A computer readable storage medium having stored thereon, computer executable instructions that, if executed by a computer system cause the computer system to perform a method comprising:
receiving an indication of new reference association with an extent of a shared storage component;
generating reference count update log information for a reference count update log to indicate said new reference association with an extent of a shared storage component, wherein said altering occurs inline;
forwarding a successful data update indicator to initiator of activity triggering said new reference association; and
updating a reference count table in accordance with said information in said reference count update log, wherein said updating is included in a background process.

9. The computer readable storage medium of claim 8 wherein said reference count update log information is a constant size.

10. The computer readable storage medium of claim 8 wherein said reference count update log information is a size corresponding to a smallest size of a storage transaction of a system.

11. The computer readable storage medium of claim 8 wherein said reference count update log information size is independent of a size of said extent of a shared storage component.

12. The computer readable storage medium of claim 8 wherein a first time for performing said generating of said reference count update log information is independent of a second time for performing said updating of said reference count table.

13. The computer readable storage medium of claim 8 wherein said reference count update log information can be applied to said reference count table in any order.

14. The computer readable storage medium of claim 8 wherein said generating reference count update log information and said updating said reference count table are performed in a cluster file system, and said reference count update log is dedicated to a cluster file system node and said reference count update log can be updated in parallel with other reference count update logs associated with other nodes.

15. A computer system, comprising:
a computer system having a processor coupled to a computer readable storage media and executing computer readable code which causes the computer system to perform operations including:
receiving an indication of new reference association with an extent of a shared storage component;
generating reference count update log information for a reference count update log to indicate said new reference association with an extent of a shared storage component, wherein said altering occurs inline;
forwarding a successful data update indicator to initiator of activity triggering said new reference association; and
updating a reference count table in accordance with said information in said reference count update log, wherein said updating is included in a background process.

16. The computer system of claim 15 wherein said reference count update log information is a constant size.

17. The computer system of claim 15 wherein said reference count update log information is a size corresponding to a smallest size of a storage transaction of a system.

18. The computer system of claim 15 wherein said reference count update log information size is independent of a size of said extent of a shared storage component.

19. The computer system of claim 15 wherein said reference count update log information can be applied to said reference count table in any order.

20. The computer system of claim 15 wherein said generating reference count update log information and said updating said reference count table are performed in a cluster file system, and said reference count update log is dedicated to a cluster file system node and said reference count update log can be updated in parallel with other reference count update logs associated with other nodes.

* * * * *